United States Patent

Cheney et al.

[15] 3,668,438

[45] June 6, 1972

[54] SHIFT REGISTER STAGE USING INSULATED-GATE FIELD-EFFECT TRANSISTORS

[72] Inventors: Glen Trenton Cheney; Ernam Fillmore King, both of Allentown, Pa.

[73] Assignee: Bell Telephone Laboratories, Incorporated, Murray Hill, N.J.

[22] Filed: July 9, 1970

[21] Appl. No.: 53,459

[52] U.S. Cl. ..........................................307/279, 307/221 C

[51] Int. Cl.....................................H03k 19/00, H03k 3/286

[58] Field of Search...............307/205, 251, 279, 221 C, 304

[56] References Cited

UNITED STATES PATENTS 3,322,974 5/1967 Ahrons et al.......................307/221 C
3,363,115 1/1968 Stephenson et al....................307/279
3,483,400 12/1969 Washizuka et al.....................307/279
3,493,785 2/1970 Rapp ....................................307/279
3,514,765 5/1970 Christensen .......................307/251 X

*Primary Examiner*—John S. Heyman
*Attorney*—R. J. Guenther and Kenneth B. Hamlin

[57] ABSTRACT

An insulated-gate field-effect transistor (IGFET) shift register stage occupies less semiconductor chip area because a separate ground lead to the gate and drain electrodes of a pair of IGFET load devices is eliminated. This lead is eliminated by substituting therefor a connection from those devices to a first clock phase which controls conduction through that pair of load devices and through a pair of cross-coupling transistors. A second clock phase, which is out of phase with the first clock phase, controls conduction through both an input transistor of the stage and a third IGFET load device connected to an output terminal of the stage.

2 Claims, 5 Drawing Figures

INVENTORS G. T. CHENEY
E. F. KING
BY Richard B. Havill
ATTORNEY

SHIFT REGISTER STAGE USING INSULATED-GATE FIELD-EFFECT TRANSISTORS

BACKGROUND OF THE INVENTION

1. Field of the Invention

The invention is a shift register stage that is more particularly described as an integrated circuit static shift register stage including insulated-gate field-effect transistors.

2. Description of the Prior Art

Integrated circuits are being made and sold in substantial numbers at present and are expected to be used more extensively in the future as their size shrinks and their costs decrease.

As a general rule, the cost of fabricating an integrated circuit varies directly with the semiconductor chip area occupied by the circuit. Thus, any reduction of the area occupied by an integrated circuit is very advantageous because the smaller circuit occupies less space wherever it is ultimately used and the cost of the circuit decreases.

In the prior art, an integrated circuit static shift register stage using insulated-gate field-effect transistor (IGFET) devices includes a pair of interconnected IGFET amplifiers. A power supply is connected to the pair of IGFET amplifiers by way of the semiconductor substrate and a metallized lead which extends across the semiconductor chip to all stages of the shift register. The power supply applies bias potential to the amplifiers by way of the substrate, and the metallized lead provides a ground return path from the amplifiers back to the power supply.

Within the stage, the IGFET amplifiers are interconnected so that a data input signal is transferred from an input terminal to an output terminal in two steps. In the first step, the data input signal is transferred from the input terminal to a first IGFET amplifier. During the second step, the data signal is transferred from the first IGFET amplifier to a second IGFET amplifier. An output terminal is connected to the second IGFET amplifier for indicating which one of two stable operating conditions of the second IGFET amplifier exists at any time. The indicated operating condition reflects the state of a data bit stored therein.

The two transfer steps are controlled by two alternatively timed clock-drive phases. The first clock-drive phase transfers the data input signal from the input terminal to the first IGFET amplifier. The second clock-drive phase transfers the data signal from the first IGFET amplifier to the second IGFET amplifier.

After the data signal is transferred to the second IGFET amplifier, a feedback path between the output terminal and the first IGFET amplifier is activated in response to the first clock-drive phase for holding the first and second IGFET amplifiers in their existing operating conditions until the next shift cycle commences.

These two clock-drive phases are applied to the IGFET amplifiers by way of two additional metallized leads, which also extend across the semiconductor chip to all stages of the shift register.

Thus, the prior art IGFET static shift register stage requires three metallized leads extending across the entire semiconductor chip. These three leads occupy a substantial portion of the semiconductor chip area utilized for the shift register.

In fact, the three leads occupy so much of the area of the semiconductor chip that the area can be reduced significantly by eliminating one or more of the leads. Such lead elimination not only reduces the chip area but also decreases the cost of fabricating each shift register.

Therefore, it is an object of the invention to develop an integrated circuit static shift register stage having less than three leads extending across the entire semiconductor chip for connection to external circuits.

SUMMARY OF THE INVENTION

The invention is an IGFET static shift register requiring only two leads extending across the semiconductor chip to all of the stages. Each stage has a pair of IGFET devices conventionally cross-coupled by way of another pair of IGFET devices through which conduction is controlled by a first clock-drive phase. Gate and drain electrodes of a pair of IGFET load devices are connected to the first clock-drive phase so that conduction through the pair of load devices also is controlled by the first clock-drive phase. A third load device is interposed between an output terminal of the shift register stage and a second clock-drive phase which is out of phase with the first clock-drive phase. The second clock-drive phase controls conduction through the third load device and through an IGFET input device of the stage.

BRIEF DESCRIPTION OF THE DRAWINGS

A better understanding of the invention may be derived from the detailed description following if that description is considered with respect to the attached drawings in which.

DETAILED DESCRIPTION

Figure 1:
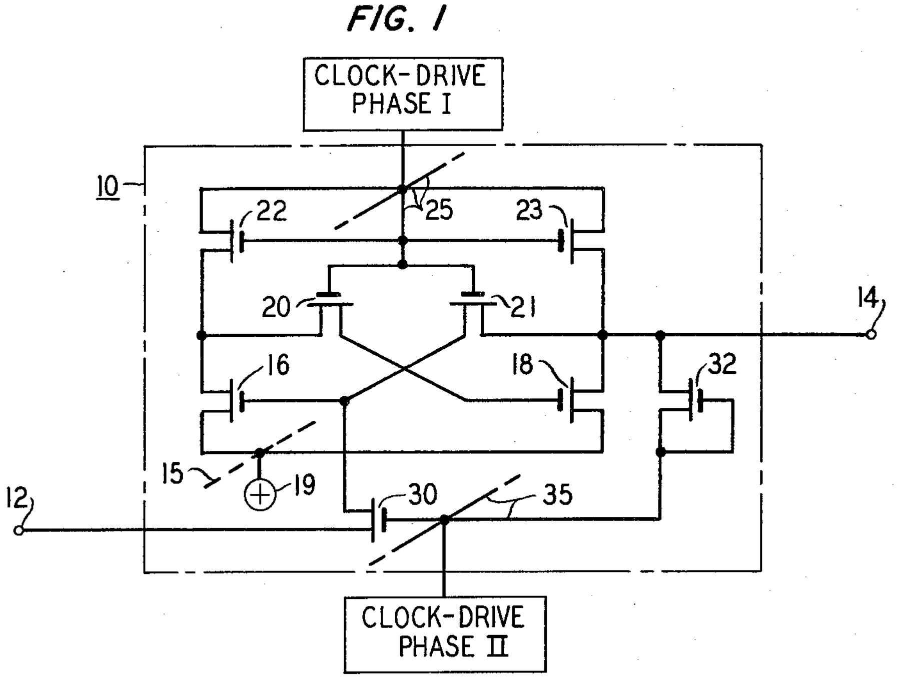
FIG. 1 is a schematic diagram of an illustrative embodiment of a shift register stage arranged in accordance with the invention.

Referring now to FIG. 1, there is shown an illustrative embodiment of a static IGFET shift register stage 10 that is one of several stages fabricated on one semiconductor chip. The stage includes eight IGFET devices which are interconnected so that they receive signals at an input terminal 12 and produce output signals at an output terminal 14.

Each of the IGFET devices of FIG. 1 is a P-channel enhancement-mode IGFET wherein conduction is accomplished by majority carriers. Each device has a gate, a source, and a drain electrode. By applying to the gate electrode of any device a negative potential with respect to the potential of the source electrode of that device, P-type majority carriers are generated in a channel extending from the source electrode to the drain electrode. The channel from source to drain is a continuous conductive path for majority carriers. These carriers are swept from the source electrode to the drain by a drain potential which is negative with respect to the source electrode potential.

Operation of the stage may be better understood if the reader understands that each of the IGFET devices of FIG. 1 will conduct from source to drain when a potential, exceeding a known threshold and of negative polarity with respect to the potential of the source electrode of the same transistor, is applied to the gate electrode. Conversely, each transistor will be cut off when the source electrode voltage is applied to the gate electrode.

Other species of IGFET devices, such as N-channel enhancement-mode IGFET devices, can be used in a circuit like the circuit of FIG. 1 if one makes appropriate changes of polarities to accommodate substituted devices.

The shift register stage includes two transistors 16 and 18 which are cross-coupled drain to gate for bistable circuit operation. A bias potential is applied to the source electrodes of the transistors 16 and 18 by way of a semiconductor substrate 15 that is connected to a power supply terminal 19. The terminal 19 is a positive potential terminal of a conventional direct current power supply that has its other terminal grounded.

Figure 3:
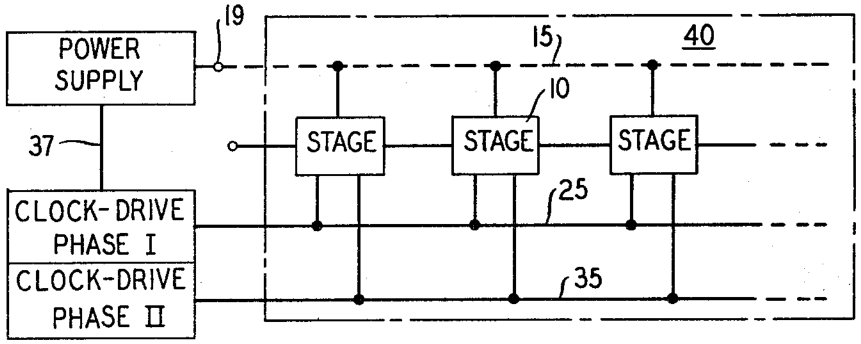
FIG. 3 is a block diagram of a shift register arranged in accordance with the invention.

The substrate 15 is shown in FIGS. 1 and 3 as a dotted line to indicate that the substrate 15 extends from the terminal 19 of the power supply across the semiconductor chip 40 to every stage of the shift register. This substrate is shorted to the source electrodes of the transistors 16 and 18 by way of a metallic connection that is deposited continuously across the source electrodes and the substrate.

In a manner that is known in the art, the transistors 16 and 18 are cross-coupled by way of the source-to-drain paths of another two transistors 20 and 21. The source and drain electrodes, respectively, of the transistor 20 are connected to the drain electrodes of transistor 16 and to the gate electrode of the transistor 18. The source and drain electrodes, respectively, of the transistor 21 are connected to the drain electrode of the transistor 18 and to the gate electrode of the transistor 16. Gate electrodes of both transistors 20 and 21 are connected to a clock-drive phase I, in a manner known in the prior art.

Two additional transistors 22 and 23 are arranged as load devices for the transistors 16 and 18. Source electrodes of the transistors 22 and 23, respectively, are connected to the drain electrodes of the transistors 16 and 18, in a manner known in the prior art. Gate and drain electrodes of the load transistors 22 and 23 are connected in common to the gate electrodes of the transistors 20 and 21 and to the clock-drive phase I. In FIG. 1 and FIG. 3, a lead 25 connects the clock-drive phase I to the transistors 20, 21, 22, and 23 and is shown partly dotted for indicating that the lead 25 also extends across the entire semiconductor chip to connect with similar transistors of other shift register stages.

In the input portion of the circuit of FIG. 1, a transistor 30 has its source-to-drain conduction path interposed between the terminal 12 and the gate electrode of the transistor 16. A clock-drive phase II applies control signals to a gate electrode of the transistor 30 for controlling conduction therethrough. The transistor 30 is made to conduct readily only at times that information is to be shifted into the stage shown in FIG. 1. The transistor 30 thus operates as an input gate which isolates the illustrative stage from changes of input signals except at predetermined times. Another transistor gate, not shown because it is located in the input portion of the next subsequent stage of the shift register, operates similar to the operation of the transistor 30 in response to the clock-drive phase II. Such transistor gate of the subsequent stage transfers information signals from the output terminal 14 of the illustrative stage to the next subsequent stage of the shift register concurrently with the receipt of information through the transistor 30 into the stage shown in FIG. 1.

In the output portion of the circuit of FIG. 1, a transistor 32 is connected as a third load device of the illustrative stage. A source electrode of the transistor 32 is connected to the drain electrode of the transistor 18. Drain and gate electrodes of the transistor 32 are connected to the clock-drive phase II, which controls conduction through the transistor 32.

In FIG. 1 and FIG. 3, a lead 35 connects the clock-drive phase II to the transistors 30 and 32 and is shown partly dotted to indicate that the lead 35 also extends across the semiconductor chip to connect with similar transistors of every stage of the shift register.

The leads 25 and 35 may advantageously be fabricated as metallized conductors affixed to the chip.

Figure 2:
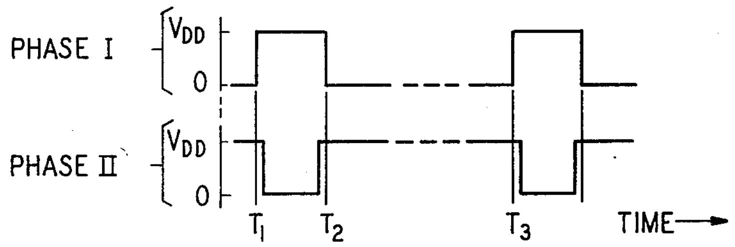
FIG. 2 is a timing diagram of clock-drive phases that control the stage shown in FIG. 1.

FIG. 2 shows the timing of the clock-drive phases I and II. These clock-drive phases are substantially out of phase with each other so that phase I is at ground potential when phase II is at a positive potential $V_{DD}$, and vice versa. For example, phase I ordinarily is at ground potential but rises to the positive potential $V_{DD}$ at the time $T_1$ and returns to ground immediately after time $T_2$. On the other hand, phase II ordinarily is held at the positive potential $V_{DD}$ but falls to ground immediately after time $T_1$ and returns to the positive potential $V_{DD}$ at the time $T_2$. The difference between the potential $V_{DD}$ and ground exceeds the threshold voltage of the devices 16, 18, 20, 21, 22, 23, 30, and 32.

The ground of the clock-drive phases I and II is returned to the grounded terminal of the power supply by way of a lead 37, as shown in FIG. 3.

While operating the illustrative stage of FIG. 1, an output signal from the preceding stage, not shown, is applied to the input terminal 12 as an input signal and is coupled through the transistor 30 to the gate electrode of transistor 16 when the clock-drive phase II is at ground potential during the interval between times $T_1$ and $T_2$. During that interval, the potential of the input signal from the preceding stage is coupled through the transistor 30 to the gate electrode of the transistor 16 for controlling conduction therethrough. The input signal from the preceding stage is either near ground potential or near the positive potential $V_{DD}$.

As previously mentioned, the clock-drive phase I and II are substantially out of phase with each other so that during the interval between the times $T_1$ and $T_2$, phase I is positive and therefore disables conduction through the transistors 20 and 21. The positive potential of the clock-drive phase I also prevents conduction through the load transistors 22 and 23 during that same interval.

If the near ground potential input signal is applied to the terminal 12 during the interval between the times $T_1$ and $T_2$, the transistor 16 is enabled to conduct. After the transistor 16 is enabled to conduct, the clock-drive phase II returns to its positive potential level at the time $T_2$ and the clock-drive phase I returns to ground. As a result, the input gate transistor 30 is cut off once again, and the transistors 20, 21, 22, and 23 are enabled to conduct. Conduction through the transistor 16 increases because the ground potential input signal is stored in the gate-to-source capacitance of the transistor 16 and the load device 22 now is enabled to conduct current. As a result of the conduction through the transistor 16, the potential on the drain electrode of transistor 16 increases substantially to the positive potential $V_{DD}$ of the supply terminal 19. Such potential $V_{DD}$ is coupled through the conducting transistor 16 and the enabled transistor 20 to the gate electrode of transistor 18.

In response to this positive potential $V_{DD}$, the transistor 18 is disabled from conducting, and its drain electrode is held at ground by the ground potential of the clock-drive phase I, which is coupled through the enabled transistor 23 to the drain electrode of the transistor 18. In turn, this ground potential on the drain electrode of transistor 18 is coupled through the enabled transistor 21 to the gate electrode of the transistor 16 for latching the transistor 16 in its conducting state.

If at the time $T_1$ the signal on the input terminal 12 were near the positive potential $V_{DD}$ rather than near ground, then the transistor 16 is disabled from conducting during the interval between times $T_1$ and $T_2$. In such a circumstance, the transistor 18 becomes biased to conduct as soon as the clock-drive phase II goes positive at time $T_2$. Then the positive potential $V_{DD}$ of the supply terminal 19 is coupled through the transistor 18 to its drain electrode.

That positive potential is coupled back through the enabled transistor 21 to the gate electrode of the transistor 16 for holding the transistor 16 disabled.

The drain electrode of the transistor 18 is directly connected to the output terminal 14 and therethrough to an input terminal of the next subsequent shift register stage, not shown. Whatever potential is produced at the drain electrode of the transistor 18 is transferred to the input terminal of the next subsequent shift register stage when the clock-drive phase II goes to ground at a time, such as immediately after the time $T_1$ shown in FIG. 2. At such time, the input transistor gate of the next subsequent stage is enabled to couple the potential from the output terminal 14 to a gate electrode of a transistor analogous to the transistor 16 but located in the next stage.

When the clock-drive phase II goes to ground immediately after the time $T_1$, the transistor 32 also is enabled to conduct. Because the transistor 32 conducts while information is being transferred between register stages, that transistor operates as a load device in place of the transistor 23, which is disabled by the clock-drive phase I at the time $T_1$.

Thus, two alternative routes are established between the drain electrode of transistor 18 and ground. One route to ground is through the load transistor 23 to the clock-drive phase I. This route is active from immediately after the time $T_2$ until the time $T_3$ while the clock-drive phase I is at ground potential. The second route to ground is through the load transistor 32 to the clock-drive phase II, which is at ground potential from immediately after the time $T_1$ until the time $T_2$. Since the two clock-drive phases are substantially out of phase with each other, the drain electrode of the transistor 18 has a return path to ground substantially all of the time. These two alternative return paths to ground require no lead across the entire semiconductor chip other than the previously mentioned pair of leads 25 and 35 connecting the clock-drive phases I and II to all of the stages of the shift register.

It is noted that in the prior art a similar pair of leads for connecting the clock-drive phases I and II to all of the shift register stages extends across the entire semiconductor chip. It is also noted that in the prior art an additional lead extends across the entire chip to provide a separate return path from the stages to ground.

The invention disclosed herein eliminates the need for the separate ground return lead by providing alternative paths from the drain electrode of the transistor 18 to the ground potential occurring in the clock-drive phases I and II. Thus, one of three leads extending across the entire chip in the prior art is eliminated by the arrangement of the invention. The elimination of this third lead reduces the chip area required by the circuit of the invention and advantageously decreases the cost of fabricating the semiconductor chip.

Figure 4:
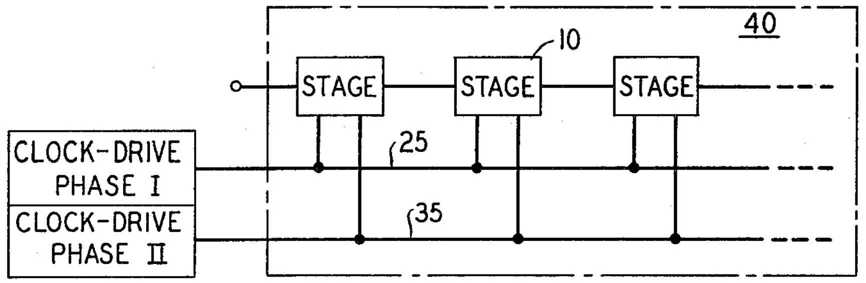
FIG. 4 is a block diagram of a shift register arranged in accordance with an alternative configuration of the invention; and 5 is a cross-sectional view of an IGFET device.

Referring now to FIG. 4, there is shown an illustrative embodiment of an IGFET shift register which operates like the shift register of FIG. 3 operates in response to the clock-drive phases I and II of FIG. 2 but without any separate direct current power supply connected to the substrate of the semiconductor chip 40. Circuit elements in FIG. 4 having counterparts in FIG. 3 use the same numerical designators for identification in both figures.

The power supply is eliminated from the circuit of FIG. 4 because the clock-drive phases I and II provide not only a ground return path but also apply the positive potential $V_{DD}$ to the substrate of the semiconductor chip. It is noted once again that the clock-drive phases I and II are substantially out of phase with each other. As a result of this phase relationship, one or the other of the clock-drive phases is at the high potential $V_{DD}$ all of the time. The potential $V_{DD}$ is coupled through a drain diffusion to the substrate in every cell of the shift register.

For instance, refer to FIG. 1 where the clock-drive phase I is shown connected to the drain electrodes of the transistors 22 and 23 and where the clock-drive phase II is shown connected to the drain electrode of the transistor 32. Each of these drain electrodes provides a path for coupling the potential $V_{DD}$ to the substrate of the semiconductor chip 40.

Figure 5:
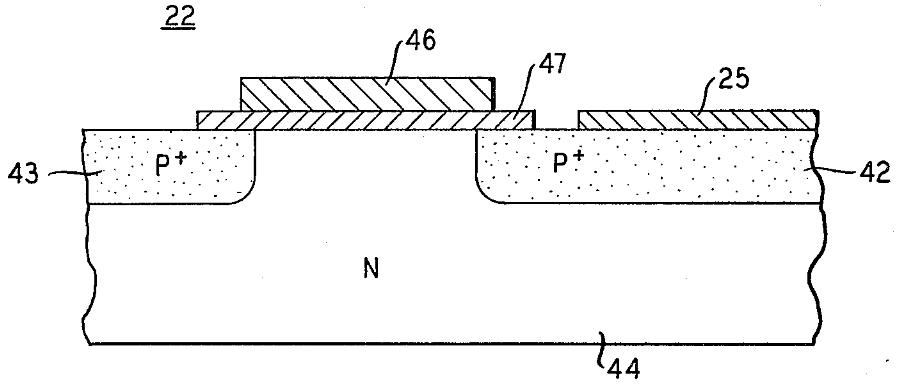

The coupling of the potential $V_{DD}$ to the substrate may be better understood by reference to FIG. 5 wherein the metallic lead 25 is shown in contact with a drain diffusion 42 of the illustrative transistor 22. In FIG. 5 circuit elements having counterparts in FIG. 1 are identified by the same numerical designators used in FIG. 1.

In FIG. 5 the drain diffusion 42 and a source diffusion 43 of P-type diffusions in an N-type substrate 44. A metallic gate electrode 46 is affixed to an insulating layer 47 disposed on the surface of the substrate 44 and the diffusions 42 and 43.

When the clock-drive phase I of FIG. 1 goes to the positive potential $V_{DD}$, the PN junction between the drain diffusion 42 and the substrate 44 is forward biased into conduction. As a result, the substrate is raised to a potential that is approximately one diode junction drop below the positive potential $V_{DD}$. The potential, at which the substrate is held, is coupled to the source electrodes of the transistors 16 and 18 of FIG. 1 by means of the previously mentioned metallic connections between those source electrodes and the semiconductor substrate.

When the clock-drive phase I goes to ground, the PN junction between the diffusion 42 and the substrate 44 is reverse biased and cut off. As a result the ground potential of the clock-drive phase I has not effect on the substrate potential which then is determined by the clock-drive phase II.

The coupling of the potential $V_{DD}$ to the substrate 44 as just described is typical of the coupling of the potential $V_{DD}$ to the substrate 44 from both clock-drive phases I and II. The phases I and II are both connected to at least one drain electrode in each stage of the shift register. Since the clock-drive phases I and II are out of phase with each other, the substrate 44 of the semiconductor chip 40 is maintained near the potential $V_{DD}$ all of the time.

The potential $V_{DD}$ must be greater than the threshold potential of the IGFET devices plus one PN junction potential drop to assure that the circuit operates satisfactorily without a separate direct current power supply.

The above-detailed description is illustrative of one embodiment of the invention and it is understood that additional embodiments thereof will be obvious to those skilled in the art. The embodiment described herein and such additional embodiments are considered to be within the scope of the invention.

What is claimed is:

1. A shift register stage comprising
   a pair of insulated-gate field-effect transistors,
   a pair of devices cross-coupling the pair of transistors,
   a pair of load devices, each connected to a different one of the transistors,
   means for controlling coincidental conduction through the pair of cross-coupling devices and through the pair of load devices,
   an input device,
   a third load device connected to one of the transistors, and
   means for controlling coincidental conduction through the input device and the third load device alternatively with respect to the conduction through the cross-coupling devices and the pair of load devices.

2. A circuit comprising first, second, third, fourth, fifth, sixth, seventh, and eighth semiconductor devices, each having source, gate, and drain electrodes,
   a source of reference potential,
   means connecting the source electrodes of the first and second devices to the reference potential source,
   means connecting the drain electrode of the first device to the source electrode of the third device,
   means connecting the drain electrode of the third device to the gate electrode of the second device,
   means connecting the drain electrode of the second device to the source electrode of the fourth device,
   means connecting the drain electrode of the fourth device to the gate electrode of the first device,
   means connecting the source electrode of the fifth device to the drain electrode of the first device,
   means connecting the source electrode of the sixth device to the drain electrode of the second device,
   first and second clock-drive phases substantially out-of-phase with each other,
   means connecting the first clock-drive phase to the gate electrodes of the third and fourth devices and to the gate and drain electrodes of the fifth and sixth devices,
   means connecting the drain electrode of the seventh device to the gate electrode of the first device,
   means connecting the source electrode of the eighth device to the drain electrode of the second device, and
   means connecting the second clock-drive phase to the gate electrode of the seventh device and to the gate and drain electrodes of the eighth device.

* * * * *